(12) United States Patent
Currier

(10) Patent No.: US 8,562,076 B2
(45) Date of Patent: Oct. 22, 2013

(54) CONFIGURABLE CUSHION DEVICE

(75) Inventor: Kristine Elizabeth Currier, San Diego, CA (US)

(73) Assignee: The Owie Pillow, LLC, San Diego, CA (US)

( * ) Notice: Subject to any disclaimer, the term of this patent is extended or adjusted under 35 U.S.C. 154(b) by 9 days.

(21) Appl. No.: 13/413,849

(22) Filed: Mar. 7, 2012

(65) Prior Publication Data

US 2013/0047341 A1  Feb. 28, 2013

Related U.S. Application Data

(63) Continuation of application No. 13/288,816, filed on Nov. 3, 2011.

(60) Provisional application No. 61/529,774, filed on Aug. 31, 2011.

(51) Int. Cl.
*A47C 20/02* (2006.01)

(52) U.S. Cl.
USPC .............................. 297/482; 297/488; 5/188

(58) Field of Classification Search
USPC ............................. 5/118; 297/482, 487, 488
See application file for complete search history.

(56) References Cited

U.S. PATENT DOCUMENTS

| | | | | |
|---|---|---|---|---|
| 4,699,401 A | * | 10/1987 | Saenz | 280/808 |
| 4,951,965 A | * | 8/1990 | Brown | 280/801.1 |
| 5,322,349 A | * | 6/1994 | Gianino | 297/482 |
| 6,322,149 B1 | * | 11/2001 | Conforti et al. | 297/482 |

\* cited by examiner

*Primary Examiner* — Fredrick Conley
(74) *Attorney, Agent, or Firm* — Pattric J. Rawlins; Procopio, Cory, Hargreaves & Savitch LLP

(57) ABSTRACT

A configurable cushion device is provided that protects from injury or discomfort caused by items in contact with a person. In one embodiment, the device includes a cushioned pillow wrapped in a protective case that includes a plurality of fastener straps for attaching the device to an object such as a seat belt. The protective case may include an internal or external pocket and may be made of a frictional material or include one or more grippers that provide additional friction against the object to keep the cushion device in a desired location with respect to the object or the person. The cushion device may also include a strap with a connector to allow the device to be secured around a larger object such as the waist of a person. The device may also include a drape cloth that is secured to the interior of the protective case and can be taken out and draped around an object or a person.

11 Claims, 4 Drawing Sheets

CONFIGURABLE CUSHION DEVICE

RELATED APPLICATION

The present application is a continuation of U.S. patent application Ser. No. 13/288,816 filed Nov. 3, 2011, which claims priority to U.S. provisional patent application Ser. No. 61/529,774 filed Aug. 31, 2011, each of which is incorporated herein by reference in its entirety.

BACKGROUND

1. Field of the Invention

The present invention is generally related to protective devices and is more particularly related to a configurable cushion device that provides protection from injury or discomfort caused by items in contact with a person.

2. Related Art

There are many items that come in contact with people during the normal course of everyday living. A large number of these items cause discomfort, physical pain or even injury. If a person happens to already be injured, physical contact by such items can cause severe discomfort and pain and can even cause further injury. Therefore, what is needed is a device that overcomes these significant problems.

SUMMARY

A configurable cushion device is described herein that provides protection from injury or discomfort caused by items in contact with a person. In one embodiment, the device includes a cushioned pillow wrapped in a protective case that includes a plurality of fastener straps for attaching the device to an object such as a seat belt. The protective case may include an internal or external pocket and may have include portions that provide additional friction against the object to keep the device in a desired location with respect to the object or the person. The device may also include a strap with a connector to allow the device to be secured around a larger object such as the waist of a person. The device may also include a drape cloth that is secured to the interior of the protective case and can be taken out and draped around an object or a person.

In an alternative embodiment, the device includes one or more fasteners to allow a plurality of devices to be connected to each other to adapt the configurable device for a particular use. An angled fastener allows two devices to be connected in an L shape to enable the combined device to attach to the lap portion as well as the torso portion of a seatbelt. Orthogonal fasteners allow three devices to form an H shape to enable the combined device to attach to a seat belt integrated with a child's car seat. Fasteners on the ends of the device allow connection of external pockets or other devices such as stuffed animals or other comfort devices.

In an alternative embodiment, the exterior of the protective case includes a custom fastener that is adapted to fit a particular object such as a hand, a foot or a wheel chair arm or leg. The interior of the protective case may also include a lined pocket that houses a compress that can be heated or cooled prior to placing the device in contact with a person.

In yet another embodiment, the device includes a zipper along the length of the casing that is configured to engage the zipper of a companion device and two companion devices are zippered together to create a large seat cushion device. In additional, the length and width of the device can be configured for specific uses such as protection for c-section injuries, pregnancy, hysterectomy, lap-band surgery, gastric bypass, hernia, appendix, gall bladder, abdominal surgery, chest/heart surgery, other surgery, tummy-tuck, liposuction, car travel, bus travel, train travel, airplane travel, cruise travel, sporting event seating, lumbar support, and the like.

Fasteners used throughout the device may include snaps, hook-and-loop, zippers, and the like as necessary or desirable for the particular use. Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a configurable cushion device that protects a person from discomfort or injury caused by items that come into contact with the person. For example, one device disclosed herein provides for a configurable cushion device that attaches to a seat belt to protect a person's abdomen from contact by the seatbelt. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
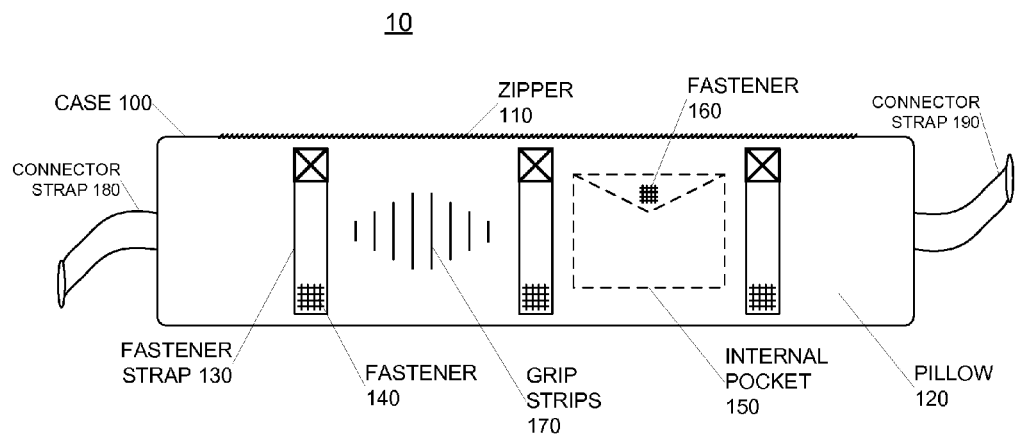
FIG. 1 is a block diagram illustrating an example configurable cushion device according to an embodiment of the invention.

FIG. 1 is a block diagram illustrating an example configurable cushion device 10 according to an embodiment of the invention. In the illustrated embodiment, the device 10 comprises a case 100 having a zipper 110 that when unzipped defines an opening in the case 100 into which pillow 120 can be inserted into the case 100.

The case 100 may be made of any of a variety of materials. In one embodiment, the case 100 is made of a stretchable fabric that functions to grip the pillow 120 when the pillow is inserted into the case 100 and also functions to grip the item to which the device 10 is attached.

The function of the zipper 110 is to open and close the case 100 to allow the user to access the internal cavity of the case 100. Accordingly, the zipper 100 may be implemented using a zipper, a hook and loop fastener, one or more buttons or snaps or the like, as will be understood by those skilled in the art.

The pillow 120 can be any of a variety of cushion devices. In one embodiment, the pillow is made of a solid foam material.

The fastener straps 130 are affixed to the case 100 at a first end and include a fastener 140 at a second end. The fastener 140 is releasably attached to the case 100. For example, the fastener 140 may be a zipper, a hook and loop, a snap, a button or the like that comprises two portions where one portion is attached to the fastener strap 130 and the other portion is attached to the case 100.

The internal pocket is located on the inside surface of the case 100. In one embodiment, the internal pocket 150 is located on the inside surface of the portion of the case 100 that is furthest away from the person who is using the device 10. This is referred to as the distal side of the device 10 and advantageously allows the person using the device 10 to be able to conveniently access the pocket 150. In an alternative embodiment, the pocket 150 can be located on the inside surface of the portion of the case 100 that is nearest to the person who is using the device 10. This is referred to as the proximal side of the device 10.

In one embodiment, the pocket 150 is configured to be closed using the fastener 160. Advantageously, the fastener 160 may comprise any of a variety of fasteners including a zipper, a hook and loop, a snap, a button and the like.

In one embodiment, one or more grippers 170 are located on the same side of the case 100 as the fastener straps 140. The one or more grippers 170 are configured to grip the item to which the device 10 is attached. One example of a gripper 170 is a strip of rubberized material that frictionally engages the item to which the device 10 is attached. Other materials that serve to grip the item to which the device 10 is attached may also be used for the one or more grippers 170 as will be understood by those skilled in the art.

The connector straps 180 and 190 are each affixed to a separate end of the case 100 and are configured to interconnect in order to allow the device 10 to be strapped around an object. In one embodiment, the connector straps 180 and 190 function to strap the device 10 around the waist or other body part of a person.

Figure 2:
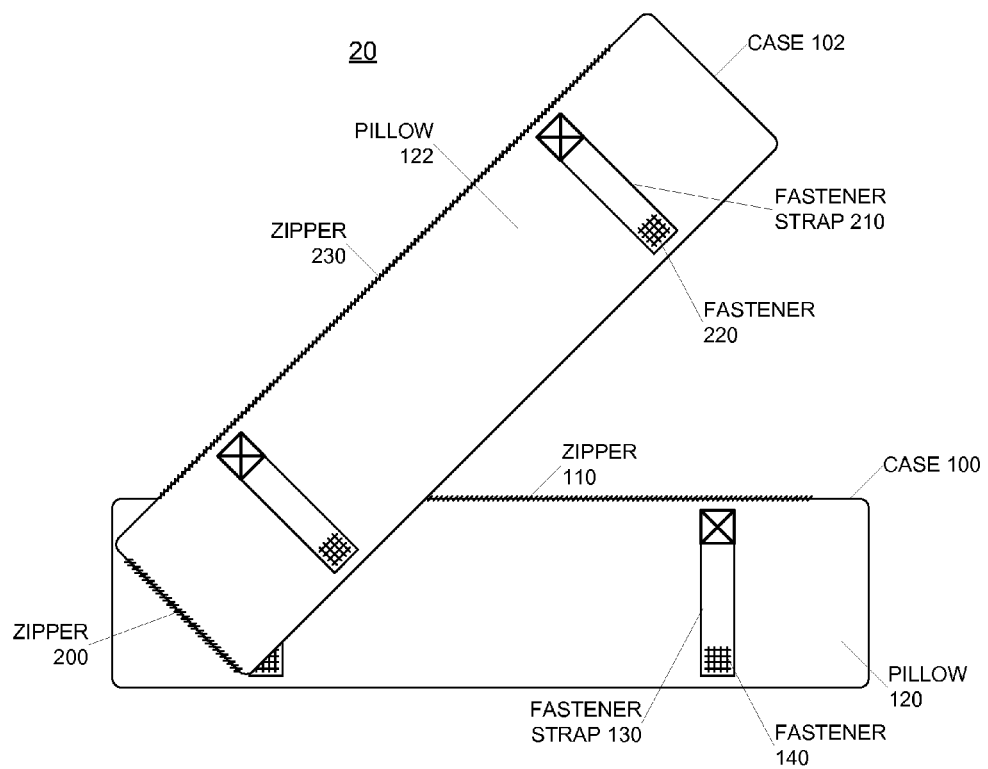
FIG. 2 is a block diagram illustrating an example configurable cushion device for use with a lap and shoulder seat belt according to an embodiment of the invention.

FIG. 2 is a block diagram illustrating an example configurable cushion device 20 for use with a lap and shoulder seat belt according to an embodiment of the invention. In the illustrated embodiment, the device 20 comprises a first case 100 and a second case 102. The first case 100 and the second case 102 are attached to each other by way of angled zipper 200.

The first and second cases 100 and 102 may include any or all of the additional elements previously described with respect to FIG. 1. As shown, the first case 100 includes a zipper 100 that defines an opening into which a pillow 120 can be inserted. The case 100 additionally includes at least one fastener strap 130 that is attached to the case 100 at a first end of the fastener strap 130 and comprises a fastener 140 at a second end of the fastener strap 130. As previously described, the fastener 140 may comprise a zipper, a hook and loop, a button, a snap or any of a variety of other fasteners as will be understood by those skilled in the art.

Similarly, the second case 102 comprises a zipper 230 that defines an opening into which a pillow 122 can be inserted. The second case 102 additionally includes at least one fastener strap 210 that is attached to the second case 102 at a first end of the fastener strap 210 and comprises a fastener 220 at a second end of the fastener strap 210. As previously described, the fastener 220 may comprise a zipper, a hook and loop, a button, a snap or any of a variety of other fasteners as will be understood by those skilled in the art.

As shown in the illustrated embodiment, the angled zipper 200 is advantageously positioned to orient the second case 102 at a particular angle with respect to the case 100. This angle advantageously approximates the angle at which the shoulder belt is positioned with respect to the lap belt in a lap and shoulder seat belt. This angle allows the device 20 to attach to both the lap belt and the shoulder belt of a lap and shoulder seat belt such that person wearing the seat belt is protected from each of the belts in the lap and shoulder seat belt.

Figure 3:
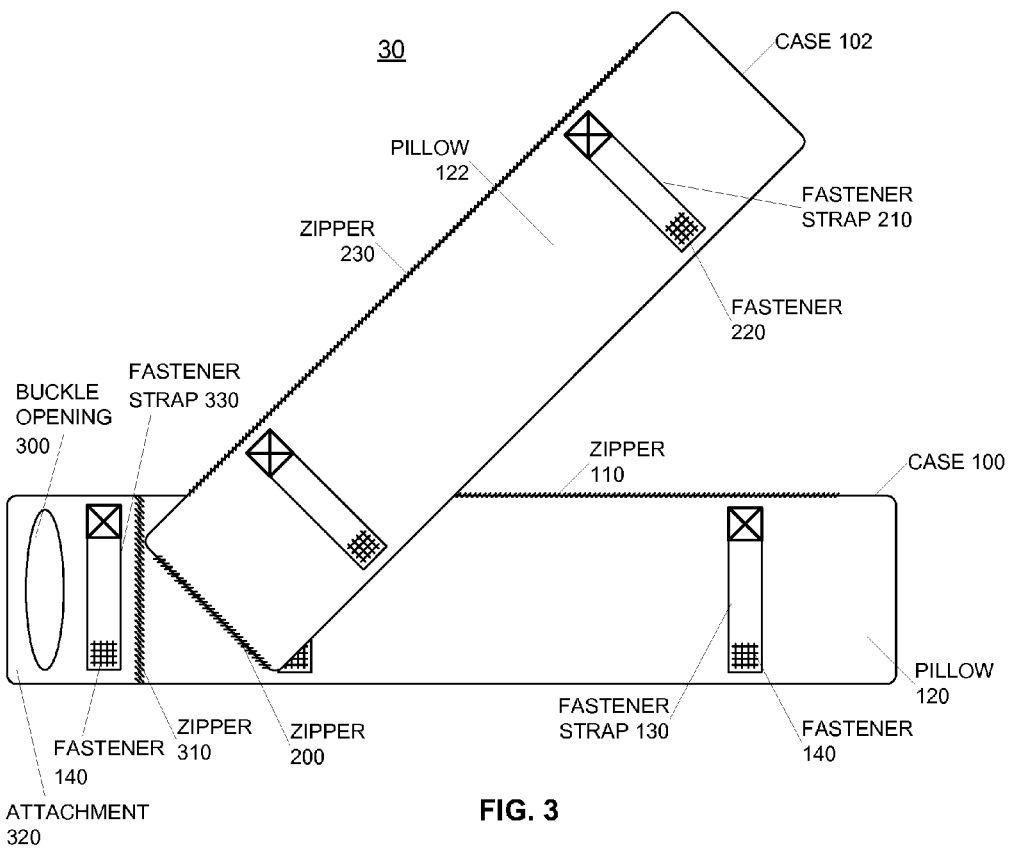
FIG. 3 is a block diagram illustrating an example configurable cushion device for use with a lap and shoulder seat belt according to an embodiment of the invention.

FIG. 3 is a block diagram illustrating an example configurable cushion device 30 for use with a lap and shoulder seat belt according to an embodiment of the invention. In the illustrated embodiment, the device 30 comprises many of the same elements as previously described with respect to FIG. 2. Accordingly, only the additional elements will be described with respect to FIG. 3. In the illustrated embodiment, the device 30 includes an extension zipper 310 that is located on a first end of the case 100 that is closest to where the angled zipper 200 is positioned on the case 100. The extension zipper 310 secures an attachment 320 to the device 30. In the illustrated embodiment, the attachment 320 comprises a buckle opening 300 and a fastener strap 330 that includes a fastener 340. Advantageously, in operation the device 30 can be attached to a seat belt with the fastener straps 130 and 220 and the buckle on the seat belt can pass through the buckle opening 300 to further secure the device 30 to the seat belt in combination with the fastener strap 330.

Figure 4:
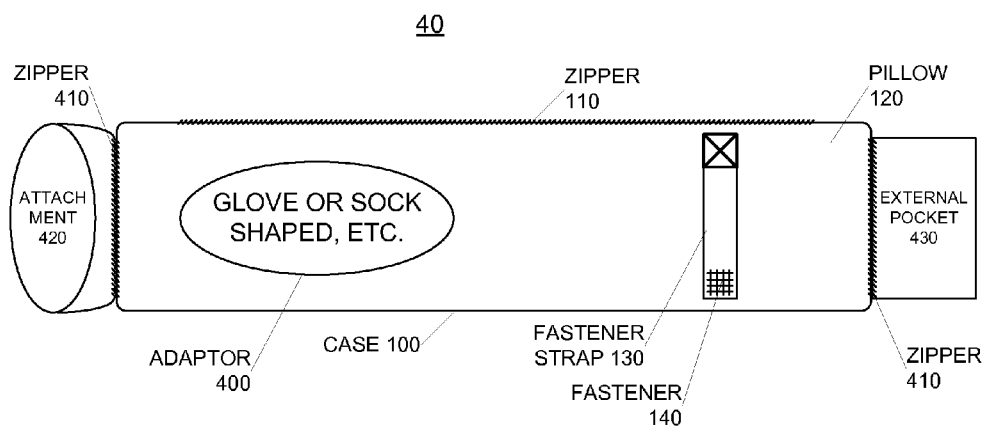
FIG. 4 is a block diagram illustrating an example configurable cushion device according to an embodiment of the invention.

FIG. 4 is a block diagram illustrating an example configurable cushion device 40 according to an embodiment of the invention. In the illustrated embodiment, the device 40 comprises a case 100 that includes a zipper 110 that defines an opening in which a pillow 120 can be inserted. The device 40 additionally includes one or more fastener straps 130 that each include a fastener 140 as previously described. In the illustrated embodiment, the device 40 includes at least one attachment zipper 410 that is located on an end of the device 40. The attachment zipper 410 allows an attachment 420 to be connected to the device 40. For example, the attachment 420 can be any of a variety of attachments such as an external pocket 430, a toy (not shown), a stuffed animal, and the like.

In addition, the device 40 may also include an adaptor 400 that is attached to the case 100. The adaptor 400 is advantageously sized and shaped to receive a particular body part or component of the item to which the device 40 is attached. For example, the adaptor 400 may be in the shape of a glove or a sock in order to snugly receive a hand or foot of a person that is wearing the device 40. In one embodiment a sock shaped adaptor 400 is open on both ends.

Figure 5:
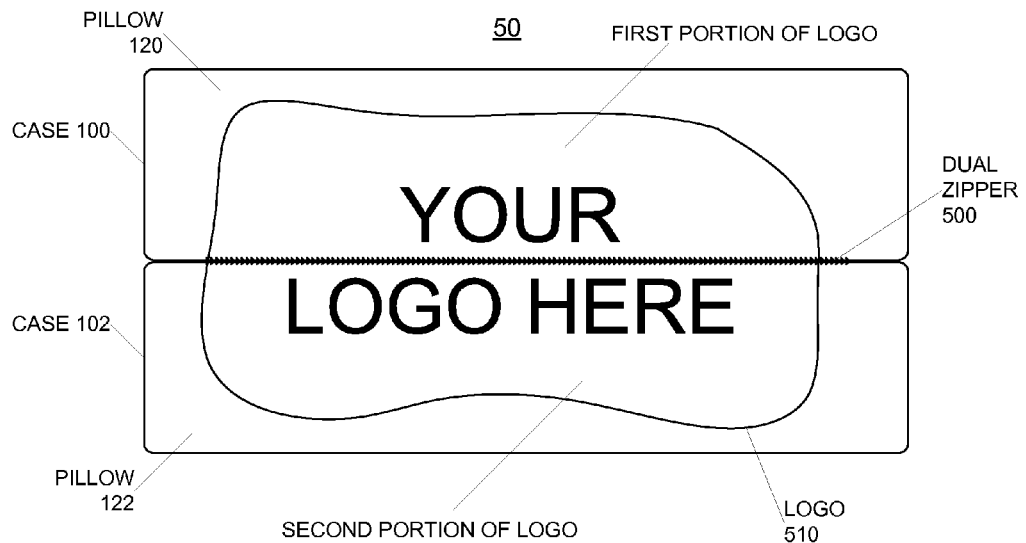
FIG. 5 is a block diagram illustrating an example configurable cushion device for use as a seat cushion according to an embodiment of the invention.

FIG. 5 is a block diagram illustrating an example configurable cushion device 50 for use as a seat cushion according to an embodiment of the invention. In the illustrated embodiment, the device 50 comprises a first case 100 and a second case 102. Each case defines an opening into which a pillow 120 or 122 can be inserted. Advantageously, a zipper on each case may define the respective openings, whereby the zipper on the first case and the zipper on the second case are each configured to mate with a portion of the zipper on the opposing case in order form a dual zipper 500 that secures the first and second cases together into a single larger case. In alternative embodiments, the zipper 500 can be an actual zipper, a hook and loop, a snap or a button, just to name a few. In one embodiment, a first portion 520 of a logo 510 is presented on the first case 100 while a second portion 530 of the logo 510 is presented on the second case 102. When the first and second cases are secured together into a single larger case, the two portions align to create the complete logo 510. In one embodiment, the first and second cases 100 and 102 can be independent and complete devices that when secured together create the device 50 that can be used as a seat cushion.

Figure 6:
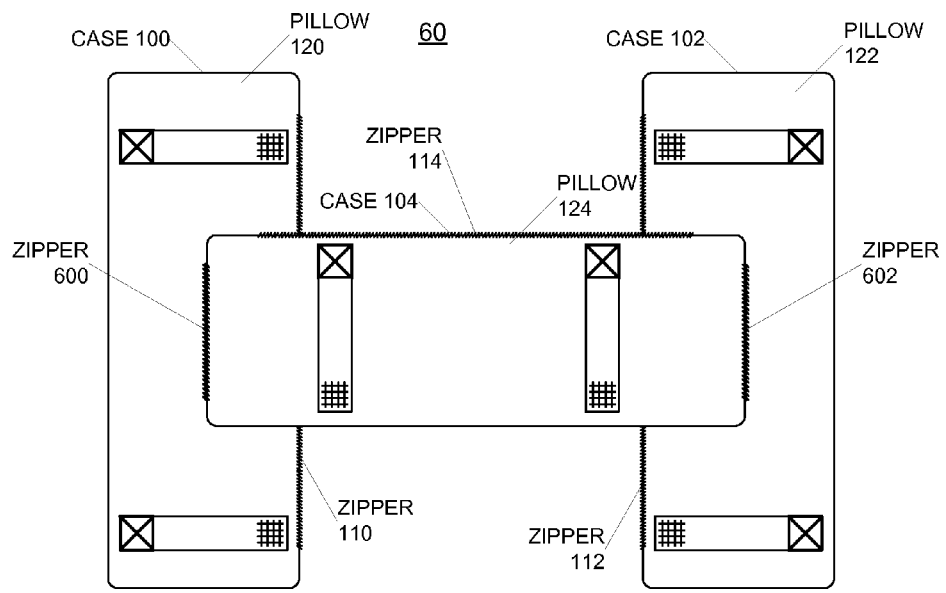
FIG. 6 is a block diagram illustrating an example configurable cushion device for use with an H belt according to an embodiment of the invention.

FIG. 6 is a block diagram illustrating an example configurable cushion device 60 for use with an H belt according to an embodiment of the invention. The H belt can be part of an amusement park ride or a child's car seat or any other apparatus that employs a similar style of safety system. In the illustrated embodiment, the device 60 comprises a plurality of cases 100, 102 and 104 that each include a pillow 120, 122 and 124, respectively. The pillows 120, 122 and 124 are positioned in an internal cavity of their respective cases 100, 102 and 104.

The first case 100 and a first end of the third case 104 each include a portion of a zipper 600 that functions to secure the first end of the third case 104 to the first case 100. Similarly, the second case 102 and a second end of the third case 104 each include a portion of a zipper 602 that functions to secure the second end of the third case 104 to the second case 102. Advantageously, when the third case 104 is secured to the first case 100 and the second case 102, the device 60 can be secured to an H belt using a plurality of fastener straps with fasteners as previously described above.

As will be understood by those skilled in the art, certain modifications to the zippers 600 and 602 will allow the device 60 to be configured in a plurality of shapes. Furthermore, the addition or subtraction of case and pillow units will also allow the device 60 be adapted to a variety of items that may come into contact with a person. Each of these alternative shapes and sizes are contemplated by the broadest scope of the present invention.

Figure 7:
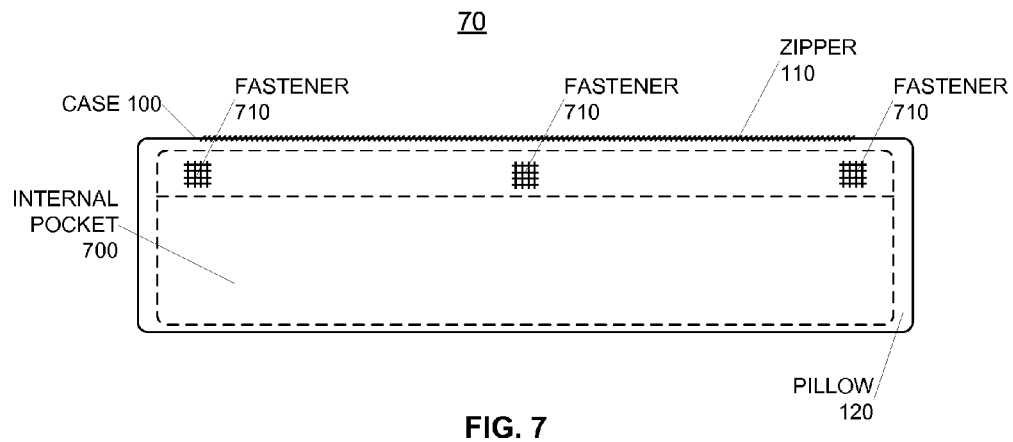
FIG. 7 is a block diagram illustrating an example configurable cushion device with a hot or cold compress pocket according to an embodiment of the invention.

FIG. 7 is a block diagram illustrating an example configurable cushion device 70 with a hot or cold compress pocket according to an embodiment of the invention. In the illustrated embodiment, the device 70 comprises a case 100 that includes a zipper 110 that defines an opening into which a pillow 120 can be inserted. The case 100 has a proximal side that is positioned closer to a person that is using the device 70 and a distal side that is positioned further away from a person that is using the device 70.

On the inside portion of the proximal side of the case 100, the device 70 includes an internal pocket 700. The internal pocket 700 may extend along substantially the entire length of the proximal side of the inside portion of the case 100 or it may only extend along a portion of the inside portion of the proximal side of the case 100. The internal pocket 700 may also include one or more fasteners 710 that function to close the internal pocket 700. The one or more fasteners 710 may include a zipper, a hook and loop, a button or a snap, just to name a few.

In one embodiment, the proximal side internal pocket 700 is configured to receive a hot or cold compress (not shown) and secure the hot or cold compress against the body of a person that is using the device 70.

Figure 8:
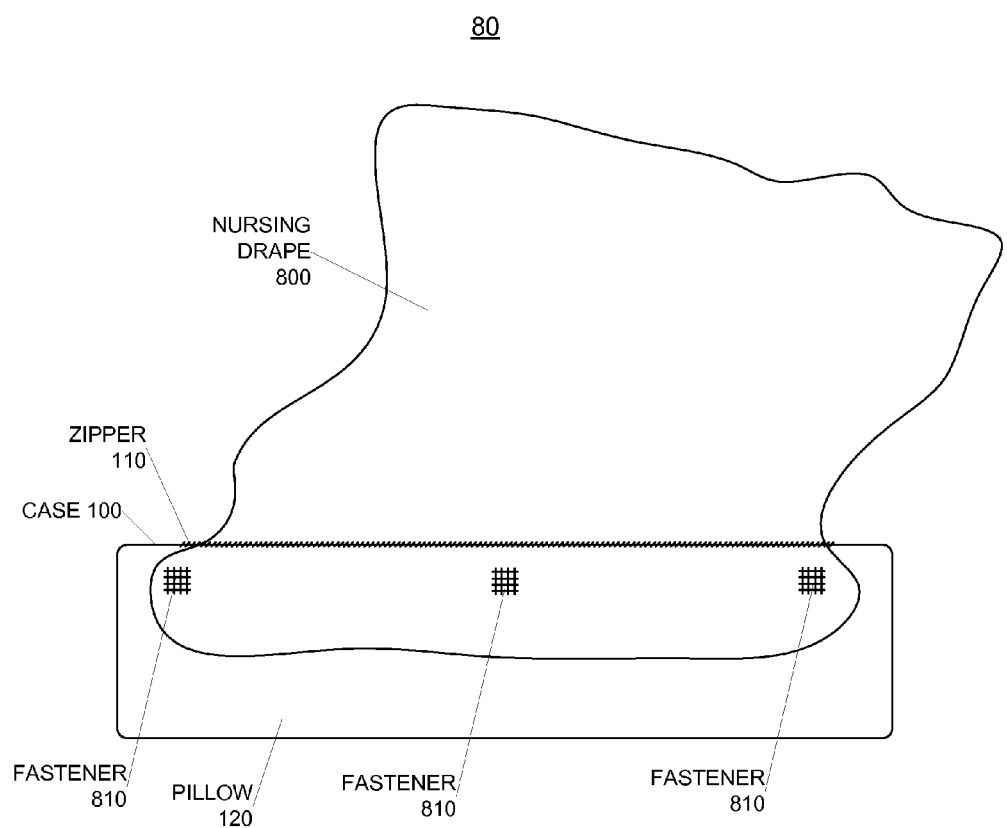
FIG. 8 is a block diagram illustrating an example configurable cushion device with a nursing drape according to an embodiment of the invention.

FIG. 8 is a block diagram illustrating an example configurable cushion device 80 with a drape 800 according to an embodiment of the invention. In the illustrated embodiment, the device 80 includes a case 100 that comprises a zipper 110 that defines an opening into which a pillow 120 can be inserted into an internal cavity defined by the case 100. The drape 800 is releasably secured to the inside portion of the device 80 using one or more fasteners 810. The one or more fasteners 810 may include a zipper, a hook and loop, a button or a snap, just to name a few. In one embodiment, the device 80 can be used as a nursing pillow for support and the drape 800 can be used as a screen for privacy. Alternative uses for the device 80 that combines the pillow 120 and drape 180 will be readily apparent to those skilled in the art.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. An apparatus for protecting a person from an item in contact with said person, comprising:
    a case comprising a proximal side configured to be positioned in contact with the person and a distal side configured to be positioned in contact with the item in contact with the person, wherein the proximal and distal sides are fastened together to define an internal cavity;
    a cushion device positioned inside the internal cavity;
    a plurality of distal fastener straps, each having a first end and a second end, wherein the entirety of each distal fastener strap is coplanar with the distal side of the case and wherein each first end is affixed to said distal side of the case and each second end comprises a first half of a first fastener means that is configured to engage a second half of the first fastener means that is affixed to said distal side of the case, wherein the distal fastener strap is configured to fasten the apparatus to the item in contact with the person; and
    at least one gripper affixed to said distal side of the case and configured to grip the item in contact with the person.

2. The apparatus of claim 1, wherein the first fastener means comprises one of a snap, a button, a zipper, and a hook and loop.

3. The apparatus of claim 1, wherein the proximal and distal sides of the case define an opening for inserting and removing the cushion device, further comprising a second fastener means configured to substantially close the opening defined by the proximal and distal sides, wherein said second fastener means comprises one of a snap, a button, a zipper, and a hook and loop.

4. The apparatus of claim 3, further comprising a first internal pocket affixed to an inside portion of the distal side of the case, said first internal pocket accessible only through said opening for inserting and removing the cushion device and comprising a third fastener means configured to substantially close said first internal pocket, wherein said third fastener means comprises one of a snap, a button, a zipper, and a hook and loop.

5. The apparatus of claim 3, wherein the opening is located in a top side of the case and the case includes a bottom side, a left side and a right side, further comprising a first connector strap affixed to the edge of the right side of the case and a second connector strap affixed to the edge of the left side of the case, wherein the first and second connector straps are connectable to secure the case into a loop configuration.

6. The apparatus of claim 3, further comprising a second internal pocket affixed to an inside portion of the proximal side of the case, said second internal pocket accessible only through said opening for inserting and removing the cushion device and comprising a fourth fastener means configured to substantially close said second internal pocket, wherein said fourth fastener means comprises one of a snap, a button, a zipper, and a hook and loop.

7. The apparatus of claim 3, further comprising a drape affixed to an inside portion of the case, said drape configured to extend more than fifty percent of the drape outward through the opening for inserting and removing the cushion device.

8. The apparatus of claim 7, wherein the drape is affixed to the inside portion using a fifth fastener means comprising one of a snap, a button, a zipper, and a hook and loop.

9. The apparatus of claim 1, wherein the case includes a top side, a bottom side, a left side and a right side, further comprising a fifth fastener means positioned on the left side and a sixth fastener means positioned on the right side, said fifth and sixth fastener means configured to affix an external adaptor to said apparatus, wherein said fifth and sixth fastener means comprise one of a snap, a button, a zipper, and a hook and loop.

10. The apparatus of claim 1, wherein an external adaptor comprises one of an external pocket and a toy.

11. The apparatus of claim 1, further comprising at least one proximal fastener strap having a first end and a second end, wherein the first end is affixed to said proximal side of the case and the second end comprises a first half of a first fastener means that is configured to engage a second half of the first fastener means that is affixed to said proximal side of the case, wherein the proximal fastener strap is configured to fasten the apparatus to the person; and at least one proximal adaptor configured to engage a body part of said person to fasten the apparatus to the person.

* * * * *